United States Patent [19]

Peterson

[11] 4,021,821

[45] May 3, 1977

[54] AUTOMATIC FOCUS CONTROL MOTIVE MEANS

[75] Inventor: Dean M. Peterson, Littleton, Colo.

[73] Assignee: Honeywell Inc., Minneapolis, Minn.

[22] Filed: Oct. 1, 1976

[21] Appl. No.: 728,568

[52] U.S. Cl. .............................................. 354/25
[51] Int. Cl.² .................................... G03B 13/18
[58] Field of Search .................... 354/25; 352/140; 250/201; 356/125, 4; 350/46

[56] References Cited

UNITED STATES PATENTS

| | | | |
|---|---|---|---|
| 3,435,744 | 4/1969 | Stimson ............................. | 354/25 |
| 3,442,193 | 5/1969 | Pagel .................................. | 354/25 |
| 3,639,048 | 2/1972 | Heaney et al. ................. | 352/140 X |
| 3,958,117 | 5/1976 | Stauffer ........................... | 354/25 X |

*Primary Examiner*—L. T. Hix
*Assistant Examiner*—Michael L. Gellner

*Attorney, Agent, or Firm*—Henry L. Hanson; Charles J. Ungemach

[57] ABSTRACT

A mechanism is provided for driving the scanning device of an automatic optical focusing system and for moving the primary optical element of such system to the desired focus position. A cam and cam follower arrangement is connected between a drive motor and the scanning device to cause the scanning device to sweep through a scene containing an object to be focused upon and to transmit radiation from such scene to the correlation optics of the system. The output of the correlation optics is processed to produce a signal indicative of the direction which the primary optical element must be moved in order to achieve the desired focus position. A bidirectional moving device is connected between the drive motor and the primary optical element and is operable in accordance with the signal to move the primary optical element in the proper direction.

16 Claims, 1 Drawing Figure

U.S. Patent  May 3, 1977  4,021,821
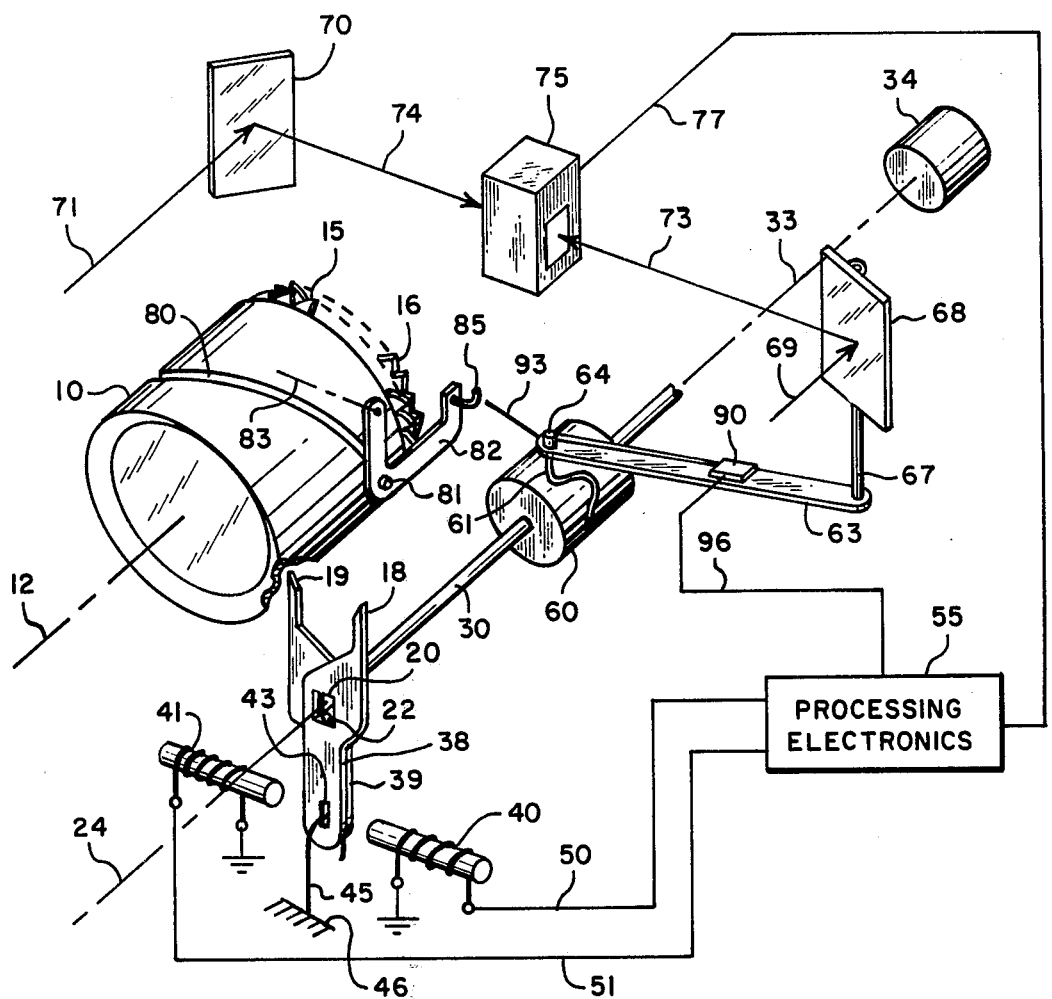

AUTOMATIC FOCUS CONTROL MOTIVE MEANS

REFERENCE TO CO-PENDING APPLICATIONS AND PATENTS

Reference is made to a co-pending application by Dean M. Peterson, Ser. No. 728,565, entitled "MOTION PRODUCING MEANS", which was filed on even date with this application and to U.S. Pat. No. 3,958,117 by Norman L. Stauffer dated May 18, 1976, both of which are assigned to the assignee of the present invention.

SUMMARY OF THE INVENTION

The present invention relates generally to apparatus for providing automatic focusing of an optical system such as a camera by properly moving a primary optical element such as the taking lens of the camera to the desired focus position. More particularly, the present invention is directed towards means for producing the desired motion of the primary optical element to the desired focus position and also properly moving the scanning member of the focusing system from the same motor. The motor is connected to a cam member which in cooperation with a cam follower periodically causes the scanning member, such as a lens or mirror, to receive radiation from a scene containing an object to be focused upon and to transmit the radiation to the correlation optics of the system. The correlation optics output is processed to produce an output signal indicative of the direction which the taking lens must be moved to achieve the desired focus. A bidirectional moving device, such as a pair of pawls is driven eccentrically by the motor and they cooperate with ratchet wheels associated with the taking lens to move the taking lens either forward or backward along the optical axis thereof depending upon which pawl-ratchet wheel combination is activated. Means such as solenoids are connected to receive the output signal and to thereby activate the proper one of the pawls to achieve the desired direction of motion. Apparatus such as a switch is also provided to compare the position of the taking with the desired focus position in order to hold the taking lens in the proper position when it has been reached.

DESCRIPTION OF THE PRIOR ART

The above referred to U.S. Pat. No. 3,958,117 is representative of one of a number of systems for automatically positioning the taking lens of a camera at a desired focus position. One disadvantage found when applying the teachings of this patent to present day cameras is the fact that the system requires the use of two driving motors, a unidirectional one for oscillating the scanning member and a bi-directional one for positioning the taking lens. Using two motors not only increases the cost and complexity of the system but also increases the size and weight which is quite disadvantageous to small hand held cameras. The present invention provides a mechanism whereby a single motor, which may be unidirectional in character, is utilized both for the positioning of the primary optical element and for the oscillatory motion of the scanning member of the automatic focus system.

BRIEF DESCRIPTION OF THE DRAWINGS

The FIGURE shows a view of the preferred embodiment of the present invention.

DETAILED DESCRIPTION OF THE PREFERRED EMBODIMENT

In the drawing, a primary optical element 10 which may be the taking lens and housing of a camera is shown. Element 10 is movable along an axis 12, which may be the optical axis of the lens. This motion may be caused by turning element 10 about axis 12 utilizing screw threads (not shown) on the camera and on the element 10 to convert the rotary motion in clockwise or counterclockwise directions to cause advancement or retraction of the lens along the axis 12 respectively. The desired rotary motion is produced by means of a pair of ratchet wheels 15 and 16 attached to element 10 which operate in cooperation with a pair of pawl members 18 and 19 respectively. Pawl members 18 and 19 are shown having a generally sqaure aperture therein which aperture contains an eccentric member of pin 22 which is driven in circular path around an axis 24. Pin 22 is connected to a shaft 30 which is connected by a mechanical connection shown as dashed line 33 to a motor 34 which may be of a sort commonly used in cameras. As shaft 30 rotates under the force of motor 34, the eccentric pin 22 will describe a circle around axis 24 and will cause pawls 18 and 19 to gyrate proximate the ratchet wheels 15 and 16 respectively. Although shown for clarity in the FIGURE as being considerably removed from the ratchet wheels 15 and 16, pawls 18 and 19 in acutual practice will be closely adjacent these wheels so that the tips of pawls 18 and 19 can engage the teeth on ratchet wheels 15 and 16 when properly energized.

Pawls 18 and 19 have arms 38 and 39 which extend down in the FIGURE to a position between a pair of solenoids 40 and 41. A small aperture 43 in arms 38 and 39 cooperates with a spring 45 connected to a fixed base as at 46. Spring 45 operates to center arm 38 between solenoids 40 and 41 when neither of the solenoids is activated. When arm 38 is centered, pawls 18 and 19 are unable to contact ratchet wheels 15 and 16 so that no turning motion of lens 10 or movement along axis 12 results.

Solenoids 40 and 41 are energized by signals on conductors 50 and 51, respectively, which are in turn connected to the output of the processing electronics shown as box 55. Processing electronics 55 may be the electronics shown in the above referred to patent 3,958,117 with conductors 50 and 51 of the present invention being the same as conductors 99 and 102 of the patent.

In the FIGURE a drum 60 having a characterized groove 61 cut therein is connected to shaft 30. A relatively flat member 63 is shown having an extension pin 64 which cooperates with the groove 61 so that as shaft 30 turns, member 63 will oscillate back and forth. Connected to the far end of member 63 is a shaft 67 to which a mirror 68 is shown affixed. Mirror 68 comprises the scanning mirror of the automatic range detection system and receives radiation along lines such as shown by arrow 69 from a field of view containing an object to be focused upon. A fixed mirror 70 also receives radiation from the field of view along lines such as shown by arrow 71 and radiation from mirrors 68 and 70 is transmitted as by arrows 73 and 74 to the image correlation module 75 of the automatic focus system. The output from the correlation module 75 is presented by means of a conductor 77 to the processing electronics 55. Scanning mirror 68 and fixed mirror 70 may correspond to scanning mirror 167 and fixed mirror 164 of the above referred to patent 3,958,117 and the image correlation module 75 may correspond to the like equipment shown in the patent with the output 77 of the present invention corresponding to the output 21 of the patent. As scanning mirror 68 moves back and forth, radiation from the scene will cause the correlation module 75 to produce a signal when the position of best focus has been reached. This signal on line 77 is presented to the range electronics 55 for processing.

Element 10 is shown having a spiral shaped groove 80 cut therein and contains a pin 81 connected to an L shaped member 82 which is pivoted about an axis 83. As element 10 turns about axis 12 pin 81 moving in groove 80 rotates L shaped member about axis 83. An angle pin 85 is attached to the remote end of L shaped member 82 and it is seen that as L shaped member 82 rotates about axis 83 pin 85 will move accordingly. The position of pin 85 is thus indicative of the linear position of element 10 along axis 12. A switch box 90 is mounted on member 63 and a feeler arm 93 extends therefrom. Feeler arm 93 moves back and forth with oscillations of member 63 and its position is thus indicative of the angular position of scanning mirror 68. The far end of feeler member 93 is positioned near pin 85 so that as member 63 oscillates back and forth, feeler member 93 comes in contact with pin 85 at some point in its travel. Since the pin 85 changes position with movement of element 10 along axis 12 and since feeler arm 93 moves with mirror 68, the point of contact between feeler arm 93 and pin 85 is indicative of the relative position of mirror 68 and lens 10. When feeler arm 93 contacts pin 85 switch 90 is operated so as to produce a signal on conductor 96 from a source (not shown) to the processing electronics 55. The relative position sensor comprising switch 90, feeler arm 93, pin 85 and L shaped member 82 may correspond generally to the relative position of the above referred to U.S. Pat. No. 3,958,117. For example, in FIG. 6 of the patent, the signal to terminal 182 of amplifier 183 is similar to the output on line 96 of the present invention.

Processing electronics 55 operates in accordance with the teachings of the U.S. Pat. No. 3,958,117 to produce an output on either line 50 or 51 depending upon whether lens 10 is on one or the other side of the desired focal position. If lens 10 is on a first side of the desired focal position, then an output on, for example, line 50 will operate solenoid 40 to cause arms 38 and 39 associated with pawls 18 and 19 to move to the right thus engaging pawl 18 with ratchet wheel 15 and causing counterclockwise rotation of element 10. If lens 10 were on the other side of the desired focal position, an output on line 51 from processing electronics 55 would operate solenoid 41, thus pulling arm 38 associated with pawls 18 and 19 to the left and engaging pawl 19 with ratchet wheel 16, thereby causing clockwise rotation of element 10.

It is therefore seen that I have provided a mechanical motion producing means which causes the oscillation of the scanning mirror in an automatic focusing system and the movement of the primary optical element from the same motor.

As an alternate embodiment of my invention and to further reduce cost, size and weight, it may in some cases be quite feasible to eliminate one of the solenoids, for example, solenoid 41 and bias spring 45 so as to cause pawl 19 to engage ratchet wheel 16 whenever the remaining solenoid 40 is not energized. Under these circumstances, the output from processing electronics 55 would occur on line 50 when the lens 10 was on a first predetermined side of the desired focal position so as to energize solenoid 40 and bring pawl 18 into engagement with ratchet wheel 15. Whenever an output would have appeared on line 51, solenoid 40 is de-energized and spring 45 causes arm 38 to move so as to engage pawl 19 with ratchet wheel 16 and turn lens 10 in the opposite direction. Thus, the lens 10 is constantly in motion back and forward about the desired focus position.

Many alterations and improvements will occur to those skilled in the art. For example, instead of using a mirror 68, such as is shown in the preferred embodiment, a lens, such as shown in FIG. 1 of the above referred to U.S. Pat. No. 3,958,117, can be employed. Also, various characterized means could take the place of follower 64 and groove 61 to cause the scanning means to oscillate and alternate forms of bi-directional drivers can be substituted for the ratchet wheel and pawl arrangement described in connection with the preferred embodiment.

I therefore do not wish to be limited by the specific disclosures used in describing the preferred embodiment but rather to be limited only by the scope of the appended claims.

I claim:

1. Apparatus for use in an autofocus system which includes a lens means having a field of view and movable along an axis, a motor, a movable scanning member, radiation receiving means and output means connected to the radiation receiving means to produce a first signal when the lens means is displaced along the axis in a first direction with respect to a desired focus position with respect to an object with the field of view comprising:
    first drive means connecting the motor to the scanning member to cause the scanning member to move and transmit radiation from the field of view to the radiation receiving means;
    second drive means connecting the motor to the taking lens and operable, upon activation, to move the taking lens along the axis in a direction opposite to the first direction;
    first connection means connecting the output means to the second dirve means so that the second drive means is activated by the first signal.

2. Apparatus according to claim 1 including position sensing means connected to the taking lens and to the scanning member and operable to produce a position signal indicative of the relative position therebetween and means connecting the position sensing means to the output means to supply the position signal thereto.

3. Apparatus according to claim 2 wherein the position sensing means comprises a first member connected to and positioned in accordance with the taking lens, a second member connected to and positioned by the scanning member and switch means operable by the first and second members.

4. Apparatus according to claim 2 including third drive means connecting the motor to the taking lens and operable upon activation to move the taking lens along the axis in the first direction and means connected to the third drive means to cause activation thereof when the taking lens is displaced along the axis from the desired focus position in a direction opposite to the first direction.

5. Apparatus according to claim 4 wherein the means connected to the third drive means activates the third drive means when the output means does not produce the first signal.

6. Apparatus according to claim 5 wherein the first connection means comprises a solenoid and the means connected to the third drive means to cause activation thereof comprises a spring.

7. Apparatus according to claim 6 wherein the second drive means and the third drive means include first and second ratchet wheels connected to the taking lens, first and second pawls connected to the motor and operable to move the first and second ratchet wheels respectively and an extension member connected to said first and second pawls extending proximate said solenoid and connected to said spring, the first signal causing the solenoid to pull the extension to a first position member against the force of the spring and engage the first pawl with the first ratchet wheel and when the output means does not produce the first signal, the spring operating to pull the extension member to a second position to engage the second pawl with the second ratchet wheel.

8. Apparatus according to claim 1 wherein the output means produces a second signal when the taking lens is displaced along the axis from the desired focus position in a direction opposite to the first direction, including third drive means connecting the motor to the taking lens and operable upon activation to move the taking lens in thee first direction and including second connection means connecting the output means to the third drive means so that the third drive means is actuated by the second signal.

9. Apparatus according to claim 8 including position sensing means connected to the taking lens and to the scanning member and operable to produce a position signal indicative of the relative position therebetween and means connecting the position sensing means to the output means to supply the position signal thereto.

10. Apparatus according to claim 9 wherein the first connection means and the second connection means include first and second solenoids respectively.

11. Apparatus according to claim 10 wherein the second drive means and the third drive means include first and second ratchet wheels connected to the taking lens, first and second pawls connected to the motor and operable to move the first and second ratchet wheels respectively and an extension member connected to said first and second pawls extending proximate said first and second solenoids, the first signal causing the first solenoid to pull the extension member to a first position to engage the first pawl with the first ratchet wheel, the second signal causing the second solenoid to pull the extension member to a second position to engage the second pawl with the second ratchet wheel.

12. Apparatus according to claim 9 wherein the position sensing means comprises a first member connected to and positioned in accordance with the taking lens, a second member connected and positioned by the scanning member and switch means operable by the first and second members.

13. Apparatus for use with a camera having a taking lens with an optic axis and a field of view, a unidirectional motor to move the lens in first and second directions along the optic axis to a desired focus position with respect to an object within the field of view, and a range detecting system which produces an output signal having a first characteristic when the lens is beyond the desired focus position in the first direction and having a second characteristic when the lens is beyond the desired focus position in the second position comprising:

first means connected to the motor and to the lens and having an input connected to the range detecting system to receive the output signal therefrom, said first means operable upon receipt of an output signal having the first characteristic to cause the motor to move the lens in the second direction, and second means connected to the motor and to the lens and having an input connected to the range detecting system to receive the output signal therefrom, said second means operable upon receipt of an output signal having the second characteristic to cause the motor to move the lens in the second direction.

14. Apparatus according to claim 13 wherein the range detecting apparatus includes radiation responsive means and a scanning member operable to scan the field of view to transmit radiation therefrom to the radiation responsive means and wherein means connected to the motor and to the scanning member are provided to cause the scan.

15. Apparatus according to claim 13 wherein the first means and the second means each include a ratchet wheel connected to the lens, a pawl connected to the motor and a solenoid connected to the range detecting system.

16. Apparatus according to claim 14 wherein means connected to the lens and to the scanning member are provided to produce a position signal indicative of the relative position of the lens and scanning member and wherein the range detecting system includes an input connected to receive the position signal.

* * * * *